Nov. 4, 1952  D. B. KENDALL ET AL  2,616,589
ATTACHMENT FOR WEIGHING SCALE HOUSINGS
Filed May 29, 1947
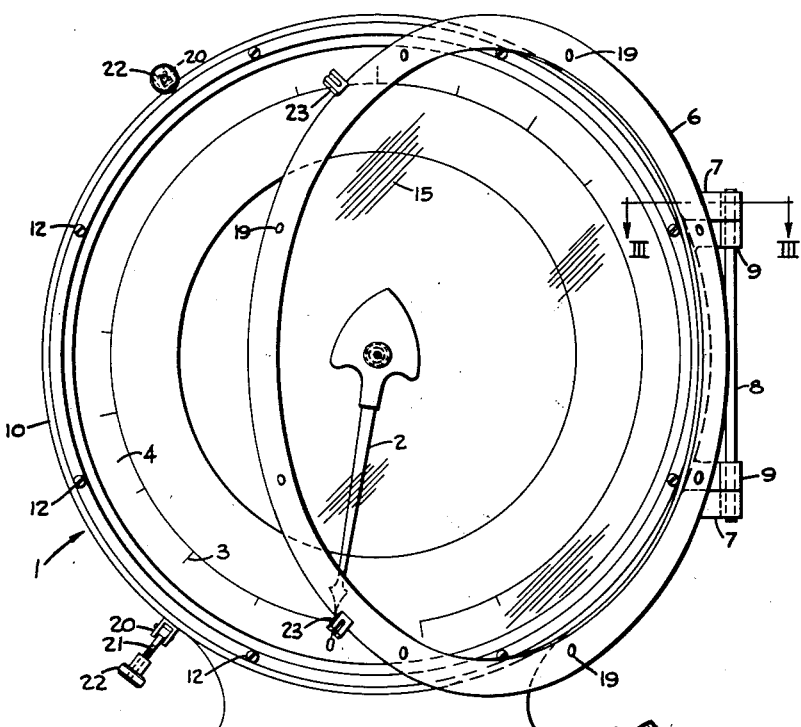
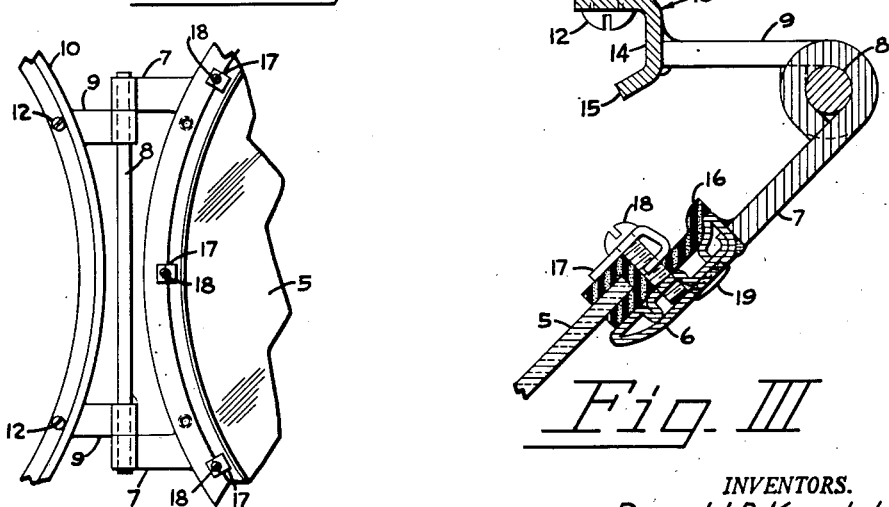
INVENTORS.
Donald B. Kendall
Homer W. Burson
BY Marshall and Marshall
ATTORNEYS Patented Nov. 4, 1952

2,616,589

UNITED STATES PATENT OFFICE 2,616,589

ATTACHMENT FOR WEIGHING SCALE HOUSINGS

Donald B. Kendall and Homer W. Burson, Toledo, Ohio, assignors to Toledo Scale Company, Toledo, Ohio, a corporation of New Jersey Application May 29, 1947, Serial No. 751,398

1 Claim. (Cl. 220—82)

This invention relates to dial housings for weighing scales and in particular to a replaceable frame for the front of such a dial housing, which replacement frame incorporates a hinge to permit ready access to the interior of the dial housing.

When weighing scales are used in certain industrial processes, it is desirable to employ adjustable pointers or adjustable contacts or other devices within the dial housing which devices either indicate specific loads or are operated by the weighing mechanism when specific loads are applied to a load receiver. These devices allow predetermined weights of material to be accumulated without requiring that the operator remember the specific amounts of each material to be used and read the scale to determine when such an amount has been placed on the scale. When weighing scales having dial housings enclosing the weighing mechanism are employed it has been the practice to modify the main portion of the dial housing by welding the stationary part of a hinge to the dial housing itself and then mounting the glazed front from the hinge. This practice is costly first because of the relatively high cost of adding the hinge to the dial housing and, secondly, because such a modified dial housing is special and must be stocked separately from the regular dial housings.

The object of this invention is to provide a hinged front for a dial housing which hinged front is complete in itself and may be easily attached to a regular dial housing without modifying the dial housing in any respect.

Another object of the invention is to provide an intermediate annular member that is attachable to the dial housing and that carries the hinge to support the glazed front for the housing and that, in addition, spaces the front away from the dial housing a sufficiently great distance to permit the insertion of auxiliary pointers or other devices within the housing.

These and more specific objects and advantages are attained according to the invention by providing an intermediate member that is attachable to a regular dial housing in place of the regular glazed front and that carries a hinge to support the glazed front of the housing.

The improved structure is illustrated in the accompanying drawings.

In the drawings:

Figure I is a front elevation of a dial housing having a hinged front constructed according to the invention.

Figure II is a fragmentary elevation showing the hinge and the portions of the intermediate member and the glazed front of the dial housing immediately adjacent the hinge.

Figure III is a fragmentary sectional view taken substantially along the line III—III of Figure I.

These specific figures and the accompanying description are intended merely to illustrate the invention but not to impose limitations on the claim.

In an ordinary dial scale a generally watchcase-shaped housing 1 serves to house a weighing mechanism that drives an indicator 2 through increments of angle that correspond to increments of load applied to the scale. The indicator 2 cooperates with indicia 3 printed or otherwise marked on a chart 4 that is mounted within the rim of the watchcase-shaped housing 1. As ordinarily constructed the front of the housing 1 is closed by a glass that is mounted in a frame attached to the housing and that corresponds to the crystal of an open-faced watch. Such a frame in ordinarily attached to the dial housing by a plurality of screws and is not removed except when adjustments must be made to the weighing mechanism. As shown in the drawings, a glass front 5 that is mounted in a frame 6 serves as the front for the dial housing 1. The frame 6 has laterally extending lugs or ears 7 that cooperate with a rod or hinge pin 8 and ears 9 extending from an intermediate annular member 10 to form a hinge that pivotally connects the frame 6 to the intermediate member 10.

Referring to Figure III the intermediate member 10 is generally L-shaped in cross section having a first side 11 that lies in the plane of the intermediate member 10 and that is secured against the dial housing 1 by means of a plurality of screws 12 inserted through holes drilled through the first or flat surface 11 and through a rubber gasket 13 into holes drilled and tapped into the housing 1. The spacing of the holes drilled through the first surface 11 of the intermediate member 10 correspond in position to the holes drilled through the bezel of a regular housing front. Constructed in this way the intermediate member 10 may be easily substituted for a regular dial housing front without making any change whatsoever in the dial housing itself.

The intermediate member 10 has a forwardly extending generally cylindrical portion 14 of relatively short length that serves as a spacer to set the dial front forward and that also provides a surface to which the ears 9 of the hinge may be welded or otherwise secured. The forwardly extending portion 14 of the intermediate member 10 has its forward edge turned inwardly to form a lip 15 against which a rubber gasket 16 of the frame 6 may rest when the dial housing is closed.

The glass 5 closing the front of the dial housing 1 is set in a channel cut in a portion of the gasket 16 and is secured in place by a plurality of clips 17 clamped to the frame 6 by screws 18. A frame similar to the frame 6 including the gasket 16 and the clips 17, but without the ears 7, is regularly used as a front for the dial housing 1 when the hinge construction is not employed. When used in that manner screws that are used in lieu of the screws 12 holding the intermediate member 10 pass through holes in the frame 6 to hold the frame in position. When the intermediate member 10 and the hinge are employed these holes in the frame 6 are no longer required and are closed by buttons 19 that are pressed into the holes in the frame.

Referring to Figure I the intermediate member 10 on the side opposite the hinge is provided with a pair of U-shaped brackets 20 in which threaded stems 21 are pivotally mounted. Thumb nuts 22 are provided on the threaded stems 21. When the frame 6 is closed against the intermediate member 10 the pivotally mounted stems 21 may be swung into slots in U-shaped ears 23 welded or otherwise secured to the frame 6 and the thumb nuts 22 may be tightened against ears 23 to hold the frame in its closed position.

The provision of the intermediate member 10 that serves to carry the stationary part of the hinge and the anchorage end of the threaded stems 21 provides a simple, economical method of supplying hinged fronts for weighing scale dial housings. In addition to the economy provided by the use of completely regular housings, the intermediate member 10 serves as a spacer to provide additional space within the housing as is usually required when additional mechanism must be installed.

Various modifications in the detail structure of the hinge or the detail shape of the intermediate member may be made without departing from the spirit and scope of the invention.

Having described the invention, we claim:

A removable glazed front for a weighing scale housing, said front comprising a first annular member having a flat radially extending portion adapted to be secured to the housing, a cylindrical portion extending axially from the outermost part of the flat portion, and an inwardly directed inclined annular portion at the end of the cylindrical portion, a pair of hinge members rigidly attached to the first annular member, a transparent disk serving as a window, an annular frame for the disk, an annular H-shaped resilient member the legs of which embrace the edge of the transparent disk and the side of which fits the annular frame, means for clamping the resilient member and disk against the annular frame, hinge members attached to the frame and cooperating with the hinge members on the first member, said annular frame having a recess adapted to receive the inwardly directed portion of the first member with the side portion of the resilient member interposed therebetween, and manually releasable means for holding the annular frame against the first annular member.

DONALD B. KENDALL.
HOMER W. BURSON.

REFERENCES CITED

The following references are of record in the file of this patent:

UNITED STATES PATENTS

| Number | Name | Date |
| --- | --- | --- |
| 319,169 | Baker | June 2, 1885 |
| 1,266,356 | Utley | May 14, 1918 |
| 1,351,853 | Hyde | Sept. 7, 1920 |
| 1,804,734 | Balzer | May 12, 1931 |

FOREIGN PATENTS

| Number | Country | Date |
| --- | --- | --- |
| 622,676 | Germany | Dec. 4, 1935 |